Patented Nov. 15, 1949

2,488,184

UNITED STATES PATENT OFFICE 2,488,184

PROCESSING OF SHRIMP

George Garnatz, Norbert H. Vollé, and Fred E. Deatherage, Cincinnati, Ohio, assignors to The Kroger Grocery & Baking Company, Cincinnati, Ohio No Drawing. Application February 6, 1946
Serial No. 645,960

2 Claims. (Cl. 99—111)

1

This invention relates to a food product, and particularly to the processing or preparation of shrimp for marketing and/or human consumption.

Heretofore, the usual procedure in the processing of shrimp consisted in cooking the shrimp in a solution embodying from 1 to 10% salt together with various condiments such as vinegar, citric acid and/or spicing materials. Under such practice, the cooked shrimp, although showing varying degrees of edibility and flavor, could generally be considered fairly satisfactory from this standpoint. The shrinkage on cooking however was quite appreciable and based on the weight of the peeled green shrimp cooking yields would vary from approximately 50% to 67%. Furthermore, the cooked shrimp upon being frozen and subsequently defrosted, showed bleeding of water, sogginess of texture and a general toughness which made this conventional method of cooking of limited satisfaction, particularly but not exclusively when applied to shrimp when frozen, defrosted, cooked, refrozen and subsequently defrosted.

The present invention includes among its objects:

To provide a method of processing shrimp whereby a greater yield is obtained while at the same time the quality of the shrimp is improved from the standpoints of tenderness, water retention, avoiding sogginess, appearance, eating quality, and general palatability.

To provide an improved product from a standpoint of conserving edibility and keeping qualities in a frozen state.

To provide an improved product in the nature of a cooking medium which may be used in the preparation of shrimp for eating and which product may be sold or marketed independently of, or in conjunction with shrimp.

In general it has been discovered that the treatment hereinafter described is applicable to shrimp either prior to freezing or shrimp which has been frozen and subsequently thawed, and comprises subjecting preferably peeled and veined shrimp to the action of an alkaline salt reagent or mixtures of same as a soaking or cooking medium which permits of swelling without gelatinization of the meat content, is freely soluble, non-precipitating, and results substantially in better cooking yields with better moisture retention in the cooked state, as well as increased tenderness in the cooked state.

The alkaline materials are agents contemplated for use in the preparation or processing of shrimp to produce a humanly consumable cooked shrimp which has improved appearance and edibility with better moisture retention before and after freezing.

It has been discovered that agents in the nature of salt reagents as certain alkaline salts of sodium, potassium and ammonium can be used and preferably sodium or potassium pyrophosphate, trisodium or tripotassium phosphate, dibasic sodium or dibasic potassium phosphate, sodium or potassium meta-phosphate, sodium or potassium carbonates, and sodium or potassium citrate, sodium or potassium tartrate, and have the ability of acting to improve the characteristics of stability, moisture retention and tenderness in the final product. Further, while it is preferable to use compounds as above described, we do not wish to exclude the use of alkaline agents in the nature of sodium, ammonium and potassium hydroxides, which act in a similar nature and may produce an improved shrimp product. However, with these latter agents, if care is not used in providing low concentrations, there is a tendency to cause a slight gelatinization of the protein about the outer layer of the shrimp.

In regard to the concentrations, it has been discovered that for best yields and tenderness, dependent upon time and temperature of cooking, varying percentages of the effective agents in water may be used. The criterion of control being determined by solution concentrations which may vary between 0.5 per cent to 2.5 per cent to produce the maximum stability and water retention giving a substantially higher cooking yield. By stability we mean to retain the shrimp in a solid state with some swelling by water retention, without digestion, sogginess or "sluffing off." It is further to be understood that these agents or mixtures of same may be used in a soaking or cooking medium either alone or with other ingredients used for seasoning and/or cooking.

More specifically for purposes of illustrating our disclosure, the agent disodium phosphate is used in the following example:

Soak five pounds of raw green peeled shrimp (which may or may not have been frozen and subsequently defrosted), for two hours in water containing 2% of disodium phosphate ($Na_2HPO_4$) then remove the shrimp and cook for eight minutes in a boiling solution composed of four gallons of water 3.6 lb. salt and 0.4 lb. sugar.

Thereafter the shrimp are prepared for commercial retail, or immediate table use by placing the hot shrimp in ice water with preferably agitation and subsequent drainage before freezing or other use, which results in a solid stable product having the advantages as described and illustrated herein. Although where it is convenient the shrimp may be cooled and marketed without freezing.

The foregoing procedure results in a better yield and a more tender product retaining these properties to a substantial degree under conditions of freezing, holding and defrosting. Various tests indicate that disodium phosphate ($Na_2HPO_4$) is particularly desirable as a soaking medium. At the same time the shrimp is tender and highly palatable either as cooked or after subsequent freezing, holding and defrosting. Apparently an ionic base exchange reaction takes place between the alkaline salt and the protein of the shrimp. However, the calcium originally present in the shrimp is retained within the mass of the soaked and cooked shrimp, therefore, said calcium continues to be biologically available to the consumer.

The disodium phosphate is also effective when used directly in the cooking medium. When added to a cooking solution containing the usual ingredients, the advantages of the improved process are realized. However, the results obtained show only slightly less gain in yield and moisture retention than is the case where the shrimp is soaked in the disodium phosphate solution prior to cooking yet the gain is substantial over standard practices and the palatability is much improved. An example of a cooking solution for green peeled shrimp is as follows:

| | Pounds |
|---|---|
| Disodium phosphate per gal. of water | 0.2 |
| Sodium chloride per gal. of water | 0.9 |
| Sucrose per gal. of water | 0.1 |

The green peeled shrimp are added to this solution at its boiling point and again brought to a boil and boiled for five or more minutes.

To illustrate a comparative test on a commercial scale the following is illustrative of 30 pound batches of fresh peeled shrimp of a treated and untreated character cooked in a standard solution of 200 pounds water and 20 pounds salt at about 215° F.

| Treatment | Cooking Time | Yield |
|---|---|---|
| | | Per cent |
| Soaked | 7 min | 74.0 |
| | | 73.1 |
| | | 73.0 |
| | | 76.3 |
| | | 76.4 |
| Average | | 74.7 |
| Unsoaked | 7 min | 68.5 |
| | | 69.2 |
| | | 70.0 |
| | | 69.3 |
| Average | | 69.2 |

The above tests were made on the basis of weight before and after cooking and show an increased yield with the enumerated advantages in quality due to the disodium phosphate treatment.

It has been determined that cooking time with quick cooling is an important factor in determining yield of cooked shrimp. The effect of cooking time on yield is demonstrated by the following data: shrimp soaked for 2 hours in 2% $Na_2HPO_4$ prior to cooking.

| Cooking Time | Initial Raw Weight | Soaked Raw Weight | Cooked Weight | Yield Soak | Yield Cook |
|---|---|---|---|---|---|
| | | | | Per cent | Per cent |
| 5 | 3.00 | 3.35 | 2.44 | 111.7 | 81.3 |
| 6 | 3.00 | 3.32 | 2.38 | 110.7 | 79.3 |
| 7 | 3.00 | 3.35 | 2.34 | 111.7 | 78.0 |
| 8 | 3.00 | 3.32 | 2.30 | 110.7 | 76.7 |
| 9 | 3.00 | 3.33 | 2.25 | 111.0 | 75.0 |
| 11 | 3.00 | 3.30 | 2.17 | 110.0 | 72.3 |
| 13 | 2.74 | 3.00 | 1.76 | 109.5 | 71.5 |

Competent tasters judged only the 5 and 6 minute shrimp undercooked.

Further illustrative of trisodium citrate and other aforementioned compounds as soaking media in various concentrations is given as follows:

Small 40 count unveined shrimp used. Soaking time was 2 hours and cooking time 6 minutes in data which follows:

| Series | Concentration—Salt | Pounds raw weight | Pounds soak weight | Pounds cook weight | Yield Soak | Yield Cook |
|---|---|---|---|---|---|---|
| | | | | | Per cent | Per cent |
| 1 | 1% $Na_4P_2O_7$ | 1.00 | 1.12 | 0.78 | 112 | 78 |
| | 2% $Na_4P_2O_7$ | 1.00 | 1.12 | 0.79 | 112 | 79 |
| | 1% $NaPO_3$ | 1.00 | 1.10 | 0.70 | 110 | 70 |
| | 2% $NaPO_3$ | 1.00 | 1.10 | 0.73 | 110 | 73 |
| 2 | 0.5% $Na_4P_2O_7$ | 1.00 | 1.11 | 0.74 | 111 | 74 |
| | 1.0% $Na_4P_2O_7$ | 1.00 | 1.13 | 0.78 | 113 | 78 |
| | 1.5% $Na_4P_2O_7$ | 1.00 | 1.12 | 0.80 | 112 | 80 |
| | 2.0% $Na_4P_2O_7$ | 1.00 | 1.13 | 0.83 | 113 | 83 |
| | 2.5% $Na_4P_2O_7$ | 1.00 | 1.10 | 0.82 | 110 | 82 |
| | 3.0% $Na_4P_2O_7$ | 1.00 | 1.11 | 0.82 | 111 | 83 |
| | 4.0% $Na_4P_2O_7$ | 1.00 | 1.09 | 0.82 | 109 | 82 |
| | 5.0% $Na_4P_2O_7$ | 0.95 | 1.03 | 0.82 | 109 | 84 |
| 3 | 0.5% $NaPO_3$ | 0.99 | 1.09 | 0.71 | 110 | 72 |
| | 1.0% $NaPO_3$ | 1.00 | 1.10 | 0.71 | 110 | 71 |
| | 1.5% $NaPO_3$ | 1.00 | 1.09 | 0.73 | 109 | 73 |
| | 2.0% $NaPO_3$ | 1.00 | 1.07 | 0.73 | 107 | 73 |
| | 2.5% $NaPO_3$ | 1.00 | 1.06 | 0.75 | 106 | 75 |
| | 3.0% $NaPO_3$ | 1.00 | 1.07 | 0.73 | 107 | 73 |
| | 4.0% $NaPO_3$ | 1.00 | 1.04 | 0.72 | 104 | 72 |
| | 5.0% $NaPO_3$ | 0.98 | 1.04 | 0.71 | 106 | 73 |
| 4 | 0.5% $Na_3$ Citrate | 1.00 | 1.07 | 0.78 | 107 | 78 |
| | 1.0% $Na_3$ Citrate | 1.00 | 1.08 | 0.78 | 108 | 78 |
| | 1.5% $Na_3$ Citrate | 1.00 | 1.09 | 0.74 | 109 | 74 |
| | 2.0% $Na_3$ Citrate | 1.00 | 1.09 | 0.77 | 109 | 77 |
| | 2.5% $Na_3$ Citrate | 1.00 | 1.06 | 0.79 | 106 | 79 |
| | 3.0% $Na_3$ Citrate | 1.00 | 1.07 | 0.79 | 107 | 79 |
| | 4.0% $Na_3$ Citrate | 1.00 | 1.07 | 0.80 | 107 | 80 |
| | 5.0% $Na_3$ Citrate | 0.79 | 0.83 | 0.63 | 106 | 79 |
| 5 | 0.5% $Na_2HPO_4$ | 1.00 | 1.07 | 0.75 | 107 | 75 |
| | 1.0% $Na_2HPO_4$ | 1.00 | 1.08 | 0.79 | 108 | 79 |
| | 1.5% $Na_2HPO_4$ | 1.00 | 1.09 | 0.82 | 109 | 83 |
| | 2.0% $Na_2HPO_4$ | 1.00 | 1.09 | 0.83 | 109 | 83 |
| | 2.5% $Na_2HPO_4$ | 1.00 | 1.08 | 0.83 | 108 | 83 |
| | 3.0% $Na_2HPO_4$ | 1.00 | 1.09 | 0.85 | 109 | 85 |
| | 4.0% $Na_2HPO_4$ | 1.00 | 1.09 | 0.85 | 109 | 85 |
| | 5.0% $Na_2HPO_4$ | 0.82 | 0.88 | 0.69 | 108 | 84 |
| 6 | 0.5% $Na_2CO_3$ | 1.00 | 1.12 | 0.82 | 112 | 82 |
| | 1.0% $Na_2CO_3$ | 1.00 | 1.12 | 0.86 | 112 | 86 |
| | 1.5% $Na_2CO_3$ | 1.00 | 1.14 | 0.87 | 114 | 87 |
| | 2.0% $Na_2CO_3$ | 1.00 | 1.14 | 0.92 | 114 | 92 |
| 7 | 0.5% $Na_3PO_4$ | 1.00 | 1.11 | 0.76 | 111 | 76 |
| | 1.0% $Na_3PO_4$ | 1.00 | 1.11 | 0.80 | 111 | 80 |
| | 1.5% $Na_3PO_4$ | 1.00 | 1.12 | 0.82 | 112 | 82 |
| | 2.0% $Na_3PO_4$ | 1.02 | 1.14 | 0.86 | 112 | 84 |
| 8 | 0.5% $Na_2$ tartrate | 1.00 | 1.08 | 0.70 | 108 | 70 |
| | 1.0% $Na_2$ tartrate | 0.98 | 1.04 | 0.69 | 106 | 71 |
| | 1.5% $Na_2$ tartrate | 1.00 | 1.07 | 0.71 | 107 | 71 |
| | 2.0% $Na_2$ tartrate | 1.00 | 1.05 | 0.72 | 105 | 72 |
| | 2.5% $Na_2$ tartrate | 1.00 | 1.04 | 0.73 | 104 | 73 |
| 9 | Distilled Water | 0.87 | 1.08 | 0.94 | 108 | 68 |
| | 0.1% NaOH | 1.00 | 1.14 | 0.79 | 114 | 79 |
| | 0.4% NaOH | 1.00 | 1.20 | 0.79 | 120 | 79 |
| 10 | 2% $Na_4P_2O_7$ | 2.00 | 2.25 | 1.75 | 112 | 87 |
| | 2% $NaPO_3$ | 2.00 | 2.19 | 1.50 | 109 | 75 |
| | 2% $Na_3$Citrate | 2.00 | 2.15 | 1.60 | 107 | 80 |
| | 2% $Na_2HPO_4$ | 2.00 | 2.19 | 1.67 | 109 | 83 |
| | Distilled $H_2O$ | 2.00 | 2.17 | 1.40 | 108 | 70 |
| | No Soak | 1.78 | | 1.35 | | 75 |

On veined large (20–24 count) shrimp with 2 hr. soaking time and 7 minute cooking time, the results using various concentrations of several salts follow:

| Series | Concentration—Salt | Pounds raw weight | Pounds soak weight | Pounds cook weight | Yield Soak | Yield Cook |
|---|---|---|---|---|---|---|
| | | | | | Per cent | Per cent |
| 11 | 0.5% Na₂HPO₄ | 4.00 | 4.40 | 2.78 | 110 | 69.5 |
| | 1.0% Na₂HPO₄ | 4.00 | 4.34 | 2.90 | 108.5 | 72.5 |
| | 1.5% Na₂HPO₄ | 4.00 | 4.38 | 3.00 | 109.5 | 75.0 |
| | 2.0% Na₂HPO₄ | 4.00 | 4.38 | 3.03 | 109.5 | 75.8 |
| | 2.5% Na₂HPO₄ | 3.81 | 4.16 | 2.96 | 109.2 | 77.7 |
| 12 | 0.5% Na₄P₂O₇ | 4.00 | 4.71 | 2.79 | 117.8 | 69.8 |
| | 1.0% Na₄P₂O₇ | 4.00 | 4.76 | 2.92 | 119.0 | 73.0 |
| | 1.5% Na₄P₂O₇ | 4.00 | 4.67 | 3.00 | 116.8 | 75.0 |
| | 2.0% Na₄P₂O₇ | 4.00 | 4.63 | 3.00 | 115.8 | 75.0 |
| | 2.5% Na₄P₂O₇ | 3.23 | 3.69 | 2.49 | 114.2 | 77.0 |
| 13 | 0.5% Na₃Citrate | 4.00 | 4.37 | 2.76 | 109.2 | 69.0 |
| | 1.0% Na₃Citrate | 4.00 | 4.33 | 2.83 | 108.2 | 70.8 |
| | 1.5% Na₃Citrate | 4.00 | 4.30 | 2.86 | 107.5 | 71.5 |
| | 2.0% Na₃Citrate | 4.00 | 4.30 | 2.91 | 107.5 | 72.7 |
| | 2.5% Na₃Citrate | 3.78 | 4.05 | 2.80 | 107.0 | 74.0 |

Those shrimp, soaked in trisodium citrate (series 4), disodium hydrogen phosphate, (series 5), and tetra-sodium-pyrophosphate (series 2) were selected best by taste testers. There was some objection to the glassy appearance and the gelatinization of those soaked in tetrasodium pyrophosphate (Na₄P₂O₇), otherwise the three different soaking media were comparable. Shrimp soaked in sodium hexametaphosphate, (NaPO₃)₆ were acceptable; with those soaked in disodium tartrate somewhat less so. Trisodium phosphate was better for soaking than sodium carbonate but neither yielded a satisfactory product because of excessive gelatinization. Shrimp soaked in sodium hydroxide were unsatisfactory and showed the greatest gelatinization of any. Indeed these shrimp showed considerable disintegration from the caustic. It is interesting to note that gelatinization of the shrimp appears to be a direct function of the alkalinity of the soaking medium:

NaOH > Na₂CO₃ > Na₃PO₄ > Na₄P₂O₇

The other salts were insufficiently alkaline to attack the shrimp and to give a glassy or jelly like surface.

As indicated above a somewhat stronger solution than 2.5% can be used but the results were not found to be sufficiently beneficial to warrant the increase of concentration.

A further illustrative comparative test involving the direct cooking method is indicated as follows:

| | Per Cent Moist | Per Cent Yield |
|---|---|---|
| 1. Standard 10% salt (NaCl) cooking Solution | 72.85 | 62.5 |
| 2. 2% tetrasodium pyrophosphate cooking sol. | 74.41 | 72.0 |

The above example 1 showed a fair comparative quality immediately after cooking but very poor quality as a frozen product. Whereas the example 2 was of improved character both in the fresh and frozen states with an increased percentage of yield.

Additional samples of mixtures of the same character used in shrimp cooking mixtures are as follows:

Mixture A

| | Pounds |
|---|---|
| Disodium-hydrogen-phosphate/gal. water | 0.2 |
| Sodium chloride/gal. of water | 0.9 |
| Sucrose/gal. of water | 0.1 |

Mixture B

| | Pounds |
|---|---|
| Sodium hexameta-phosphate/gal. of water | 0.2 |
| Sodium chloride/gal. of water | 0.9 |
| Sucrose/gal. of water | 0.1 |

Mixture C

| | Pounds |
|---|---|
| Sodium citrate/gal. of water | 0.2 |
| Sodium chloride/gal. of water | 0.9 |
| Sucrose/gal. of water | 0.1 |

Illustrative procedures preferred for home cooking but which may be used in preparing shrimp for commercial use are as follows:

Procedure I.—Bringing the solution to a boil, adding the shrimp and cooking for six or more minutes.

Procedure II.—Soaking the shrimp for 1 hr. in a solution of the ingredient then adding the salt and sucrose and bringing this solution containing the shrimp to a boil and boiling for five or more minutes.

Procedure III.—Adding the shrimp to the solution and bringing to a boil and boiling for five minutes or more.

Of the above, procedure III is preferred and it is further stated that the cooking time may be from 5 to 8 minutes.

The preparation may take the form of a dry mixture including the salt and various condiments and sold in a separate package or container to be used by the housewife or other individual in preparing the shrimp for immediate serving and eating. The package may be sold with the shrimp, or may be sold independently with suitable directions for use in cooking shrimp.

A suitable example of a dry mix is as follows:

Dry mix—
| | |
|---|---|
| Disodium phosphate | pounds__ 2 |
| Sucrose | do____ 1 |
| Salt | do____ 9 |
| Pepper and/or other spices | ounces__ ½ |

Use 1 cup of this mixture to 2 quarts of water for cooking ½ lb. of green peeled shrimp.

The same procedure as outlined above may be used for treating and/or cooking the shrimp with trisodium phosphate or sodium citrate, and other similar alkaline agents in suitable concentrations and with or without admixtures as desired. Further it is to be understood that the treatment herein described is applicable to shrimp which is to be canned.

It will be understood that the specific examples and steps recited herein are not to be construed as a limitation, but that certain variations are contemplated without departing from the scope of the invention as defined by the appended claims.

What is claimed is:

1. A method of processing raw shrimps to render them edible, said method comprising soaking the raw shrimps in an aqueous solution containing approximately 2% by weight of dibasic sodium phosphate for a period of about two hours, and then cooking the shrimps in a boiling brine solution.

2. The method of processing raw shrimps which comprises subjecting them to an aqueous solution containing from approximately 0.5% to 2.5% by weight of an alkaline salt selected from the group consisting of alkali metal and ammonium dibasic and tribasic phosphate, metaphosphate, pyrophosphate, tartrate, carbonate and hydroxide, for a period of time sufficient to effect an ionic base exchange reaction between the alkali metal salt and the protein of the shrimps without gelatinizing the meat content of the shrimps.

GEORGE GARNATZ.
NORBERT H. VOLLÉ.
FRED E. DEATHERAGE.

REFERENCES CITED

The following references are of record in the file of this patent:

UNITED STATES PATENTS

| Number | Name | Date |
|---|---|---|
| 180,627 | Parent | Aug. 1, 1876 |
| 1,016,046 | Taylor | Jan. 30, 1912 |
| 1,920,222 | Taylor | Aug. 1, 1933 |
| 1,927,123 | Howe | Sept. 19, 1933 |

OTHER REFERENCES

"Marine Products of Commerce," 1923, by D. K. Tressler, pages 553 to 558.